United States Patent [19]
Langen

[11] Patent Number: 5,270,496
[45] Date of Patent: Dec. 14, 1993

[54] TENSION BAR

[75] Inventor: Hans-Jürgen Langen, Frechen, Fed. Rep. of Germany

[73] Assignee: Jean Walterscheid GmbH, Lohmar, Fed. Rep. of Germany

[21] Appl. No.: 978,137

[22] Filed: Nov. 18, 1992

[30] Foreign Application Priority Data

Nov. 21, 1991 [DE] Fed. Rep. of Germany ........ 4138289

[51] Int. Cl.$^5$ .......................... G01G 19/14; G01G 3/14
[52] U.S. Cl. ................... 177/147; 177/210 C
[58] Field of Search ............................ 177/147, 210 C

[56] References Cited

U.S. PATENT DOCUMENTS

| | | | |
|---|---|---|---|
| 1,094,904 | 4/1914 | Hughes | 177/147 |
| 3,144,088 | 8/1964 | Kaplan | 177/147 |
| 4,824,315 | 4/1989 | Naab et al. | 177/147 |

FOREIGN PATENT DOCUMENTS 0496166 7/1992 European Pat. Off. .

Primary Examiner—George H. Miller, Jr.
Attorney, Agent, or Firm—Harness, Dickey & Pierce

[57] ABSTRACT

A tension bar especially a lifting bar, connects the lower steering arm of a three-point attaching device to the associated force arm of a tractor. The lifting arm is connected to the force arm and lower steering arm through attaching ends. A tension axis extends through the attaching ends of the lifting bar. The lift bar 5, in the direction transverse to the tension axis 12, is divided into an upper bar part 9 and a lower bar part 10. The upper bar part 9 and the lower bar part 10 are connected to one another by a bending beam 11, which is arranged outside the tension axis 12. The upper bar part 9 and the lower bar part 10 are separated from one another by a gap 13 which extends transversely to the tension axis 12 and to the bending beam 11. At the end of the transverse tension axis 12 facing away from the bending beam 11 a connecting element 15 is provided which is anchored both to the upper bar part 9 and to the lower bar part 10. The connecting element 15 limits the change in the width of the gap. A measuring device 19 is coupled with the lower bar part to measure the width of the gap.

9 Claims, 2 Drawing Sheets

TENSION BAR

BACKGROUND OF THE INVENTION

The invention relates to a tension bar for transmitting tensile forces, and more particularly to a lifting bar or upper steering arm of a three-point attaching device of tractor. The bar is attached to the attaching points of the parts to be connected. The bar includes attaching ends with the tension axis of the tension bar extending through its center.

Many agricultural implements are designed to be attached to a tractor. In particular, light soil working equipment such as harrows, rotary cultivators and implements distributing fertilizer and seeds such as fertilizer distributors and sowing machines are types of implements attached to tractors. It is common practice to functionally connect these tractor implements to the tractor via a three-point attaching device. The device includes an upper steering arm and a lower steering arm. In the case of tractor implements which do not come into contact with the soil and which supply the soil with substances, such as fertilizer distributors and sowing machines, it is insufficient, for operational and environmental reasons, to distribute the load of substances or materials from the driver's seat with the help of a preselected setting. In these cases, it is important for such substances or materials to be accurately metered. Such metering is permitted by continuously determining the weight of the loaded implement. Thus, at any time, even and especially when negotiating agricultural land, the weight loss resulting from the distribution of substances can be determined.

In the case of heavy implements carried by the three-point attaching device at the tractor rear, the load on the front axle is reduced, which, when operating a four-wheel drive, leads to a reduction in the contribution to traction made by the front wheels. Devices are know which determine the weight of tractor implements loaded with goods, also referred to as tractor scales.

DE 35 39 825 C2, published Jun. 8, 1989, provides frame structures arranged between the three-point attaching device of the tractor and the implement. The frame structure includes a load frame and a carrier frame connected together by a spring suspension which includes a pressure sensor to determine the weight of the implement.

DE 39 23 198 A1, published Jan. 24, 1991, describes tractor scales which also include a frame structure and which are arranged between the three-point attaching device and the tractor implement. These proposals are disadvantageous because the additional structure increases the weight of the complete tractor/implement system and changes the implement kinematics, which compensation for is expensive, and increase the maintenance expenditure.

DE 38 20 757 A1, published Dec. 28, 1989, discloses combining an electro-hydraulic lifting and control system of a tractor with a device to determine the weight of the attached loads, such as tractor implements loaded with goods, without using an additional frame structure arranged between the three-point attaching device and the tractor implement. By locating sensors in carefully selected regions in a control device, it is possible to obtain both load and position dependent signals which allow the weight to be determined via an electronic evaluating unit.

Incorporating the electro-hydraulic lifting and control device in the weight determining system causes several problems. One problem with pure pressure measurements is that a complicated electron system is required due to the fact that it becomes necessary to take into account the compensation of static and hydraulic interfering influences and the relatively high hysteresis. Integrating the system weight determining system into the existing electron-dynamic lifting system does not enable the weight to be determined independently of the system. Any problems which might arise in the hydraulic system always lead to disturb the weight determining process. Furthermore, a weight determining process which is independent of the center of gravity and lifting height, which is very largely possible, requires a more sophisticated technical and electronic system. All the electronic facilities are at risk, especially with respect to their functioning, if the implement received by the three-point attaching device, in the lifted position, required for transport is subject to uneven tracks and roads which cause impacts which greatly exceed standard operational loads.

SUMMARY OF THE INVENTION

It is an object of the present invention to provide a tension bar which enables the recording of signals which depend on the magnitude of the tensile forces acting on the tension bar. The system is reliable for the entire range of application, enables for a long service life and ensure protection against overloading within the range where values are recorded.

In accordance with the invention, a dividing plane, transverse to the tension axis, divides the tension bar into an upper bar part and a lower bar part. The upper bar part and the lower bar part are connected to one another by a parallel extending bending beam arranged outside the tension axis. The upper bar part and the lower bar part are separated from one another by a gap extending in the dividing plane and transverse to the bending beam. A connecting element is offset from the bending beam, which is anchored to both the upper bar part and to the lower bar part. The connecting element bridges the gap and enables a relative movement between the upper bar part and the lower bar part. The movement varies the width of the gap to a limited extent. A measuring device to measure the width of the gap is provided so as to be offset in parallel from the bending beam.

The bending moment which results from the tensile forces occurring in the tension bar causes the bending beam arranged outside the sphere of the force effect of the tension axis to be bent. This leads to an increase in the size of the gap. The width of the gap is measured by a suitable measuring device, for example a sensor. The size of the gap is directly proportional to the applied force. By changing the length of the bending beam and by changing the distance between the bending beam and measuring device, a predeterminable size of the width of the gap is obtained. The load bearing capacity of the bending beam is designed to be such that in the range of the to be measured loads, an easily measurable gap width is obtained.

However, as in practice, frequently higher dynamic peak loads occur. Thus, the bending beam would be overstretched if it is only designed for a nominal load. To avoid any overloading, a connecting element is provided which prevents too great an increase in the size of the gap. If loads occur which are above the permissible load bearing capacity of the bending beam, these forces are accommodated by the connecting element so that impermissible deformation of the bending beam does not occur. This means that the sensitivity of the measuring system may be designed for its nominal load, but, on the other hand, it is also possible to transfer peak loads whose magnitude no longer needs to be measured. The measuring element is not subjected to loads.

This unit has a further advantage in that it can easily be integrated into the existing space inside the three-point attaching device. Also, the device is located in the power flow as part of the tension bar. Thus, there is no need for complicated external assembly procedures relating to additional measuring devices.

In one embodiment of the invention, the connecting element is arranged outside the tension axis. The tension axis preferably extends between the bending beam and the connecting element.

To be able to achieve the greatest possible measuring range with a high degree of accuracy, the measuring device should be arranged at a greater offset from the tension axis than the connecting element. The measuring device for measuring the width of the gap is preferably arranged in the upper bar part or in the lower bar part. The opposed face of the other bar part serves as a reference face. It is further proposed that the gap should end in an aperture including a wall extending parallel to the bending beam.

A particularly great variation in the size of the gap may be achieved in that both the upper bar part and the lower bar part include projections which ar arranged at the tension axis end opposite the bending beam. The projections are separated by the gap only and are provided with the measuring device for measuring the width of the gap.

The connecting element is preferably designed as a bolt threaded into a threaded bore in the upper bar part and guided through a bore in the lower bar part.

Preferably the measuring device is designed as a proximity sensor or a similar sensor connected to an evaluating unit. The evaluating unit generates necessary signal to the driver with respect to the force acting in the tension bar.

Preferred applications are lifting bars connecting the force arm of a tractor to the lower steering arms, or upper steering arms for connecting the tractor and implement. Applications in other connections involving the transmission of tensile forces may also be considered. One such application is a tension connecting system for attaching an implement to a tractor.

From the following detailed description taken in conjunction with the accompanying drawings and subjoined claims, other objects and advantages of the present invention will become apparent to those skilled in the art.

BRIEF DESCRIPTION OF THE DRAWINGS

An embodiment of the invention in the form of a lifting bar constituting the tension bar is illustrated in the drawing wherein.

DETAILED DESCRIPTION OF THE PREFERRED EMBODIMENT

Figure 1:
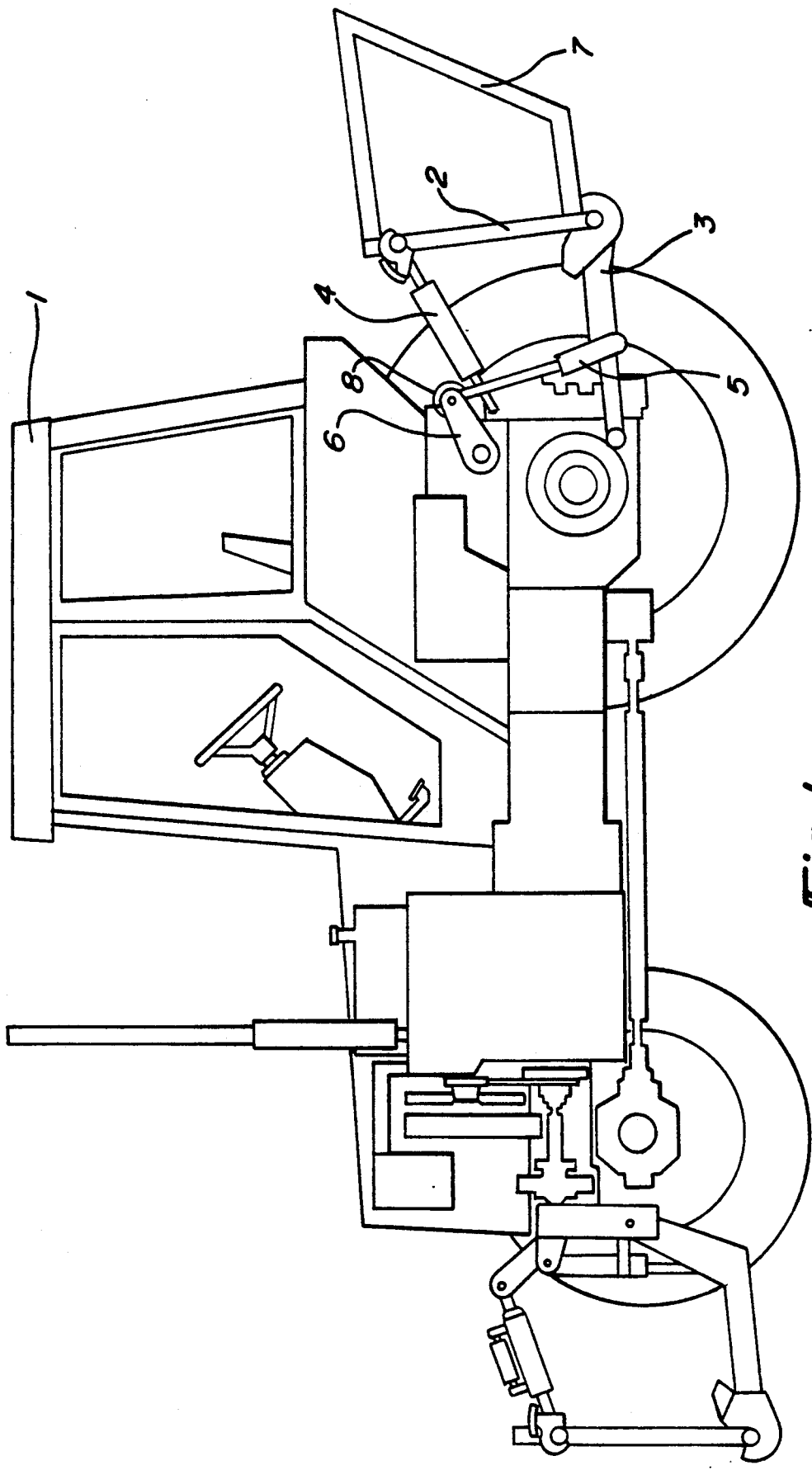
FIG. 1 is an elevational view of a tractor including a three-point attaching device.

In accordance with FIG. 1, a three-point attaching device 2 is provided at the rear of the tractor 1. The illustration of the three-point attaching device 2 shows a lower steering arm 3, an upper steering arm 4, a lifting bar 5 and a force arm 6, which raises and lowers the lifting bar 5 and thus the lower steering arms 3. The lifting bar 5 is designed in accordance with the invention. A load 7 in the form of an implement, e.g. a fertilizer distributor, which is carried by the three-point attaching device is attached to the two lower steering arms 3 and to the upper steering arm 4. The lifting bar 5 is provided in an articulation region 8 of the lifting bar 5 at the force arm 6.

Figure 2:
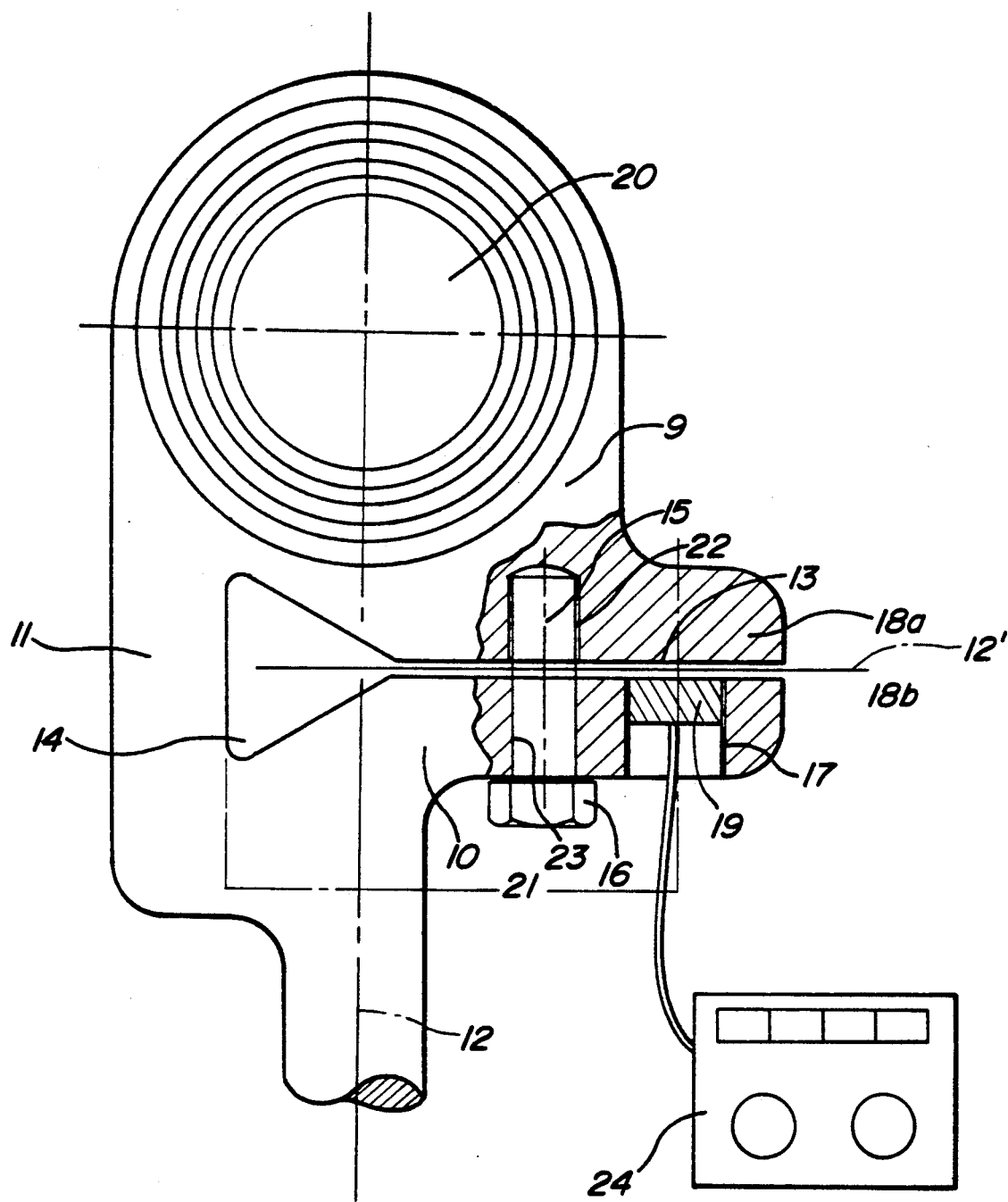
FIG. 2 is a plan view partially in section of a lifting bar with an upper bar part, a lower bar part as well as a measuring device.

FIG. 2 shows a section through part of the lifting bar 5 in the articulation region 8. The bar 5 includes an upper bar part 9 and a lower bar part 10 which are connected to one another via a bending beam 11. The bending beam 11 extends parallel to the tension axis 12, which extends through the centers of the connecting ends of the lifting bar 5 at the force arm 6 and the associated lower steering arm 3.

A gap 13 extends transversely to the tension axis 12 and the bending beam 11. The gap 13 ends in an aperture 14 having a tensile axis 12' and a wall which is parallel to the bending beam 11. At the end of the tension axis 12' opposite the bending beam 11 there is arranged a connecting element 15. The connecting element 15 is designed as a bolt with a bolt head 16. The bolt 15 passes through bore 23 of the projection 18b of the lower bar part 10 and is threaded into a threaded bore 22 of the projection 18a of the upper bar part 9. The bores are parallel to the tension axis 12.

A gap, which provides the free length between the bolt head 16 and the outer face of the projection 18b, is dimensioned such that within the range of standard tensile loads, a change is possible in the width of the gap 13. In the case of overloading, further deformation or widening of the gap 13 is prevented by the bolt head 16 contacting the outer face of the projection 18b of the lower bar part 10. In overloading conditions, the bolt 15 then accommodates part of the tensile force. The tension axis 12 extends between the bending beam 11 and the bolt 15.

A bore 17 of the projection 18b of the lower bar part 10 receives a measuring device 19 to measure the width of the gap 13. The lower bar part 10 continues below the bending beam 11 and below the projection 18b in the direction of the lower steering arm 3. The upper bar part 10, with a connecting eye 20, is articulated at the force arm 6. The tensile force applied by the lower steering arm 3 and the force arm 6 extends in the tension axis 12 and causes the bending beam 11 to bend, which, in turn, leads to gap widening which is measured by the measuring device 19, which is in the form of a proximity sensor.

The sensor measures the change in the width of the gap 13. The change in the gap is proportional to the force applied by the force arm 6 and the lower steering arm 3. The force is directly related to the weight of the load 7 attached to the three-point attaching device. As a result of the bolt 15 permitting a relative movement between the upper bar part 9 and the lower bar part 10, the gap 13 can easily widen. The bolt head 16 prevents the bending beam 11 from being overstretched. The bolt 15 takes on the function of an overload safeguard.

The distance 21 and the length of the bending beam 11 affect the change in the width of the gap 13. Furthermore, the measuring device 19 is connected to an evaluating unit 24 generating, for the operative or driver, a signal which is dependent on the tensile force.

While the above detailed description describes the preferred embodiment of the present invention, the invention is susceptible to modification, variation, and alteration without deviating from the scope and fair meaning of the subjoined claims.

I claim:

1. A tension bar for transmitting tensile forces comprising:

an elongated bar having two attaching ends;

a tension axis of the tension bar extending through centers of the attaching ends, one of the attaching ends includes a dividing plane extending transversely to the tension axis which divides the tension bar into an upper bar part and a lower bar part, the upper bar part and the lower bar part are connected to one another by a bending beam arranged outside the tension axis and extending parallel thereto, the upper bar part and the lower bar part are separated from one another by a gap extending in the dividing plane and transversely to the bending beam;

offset from the bending beam a connecting element is positioned and is anchored to both the upper bar part and to the lower bar part, the connecting element bridges the gap and enables a relative movement between the upper bar part and the lower bar part, and enables varying of the width of the gap; and a measuring device for measuring the width of the gap, said measuring device being positioned offset in parallel from the bending beam.

2. A tension bar according to claim 1, wherein the connecting element is arranged outside the tension axis.

3. A tension bar according to claim 1, wherein the tension axis extends between the bending beam and the connecting element.

4. A tension bar according to claim 1, wherein the measuring device is arranged at a greater offset from the tension axis than the connecting element.

5. A tension bar according to claim wherein the measuring device for measuring the width of the gap is arranged in the upper bar part or in the lower bar part and that the opposed face of the other bar part serves as a reference face.

6. A tension bar according to claim 1, wherein the gap ends in an aperture including a wall extending parallel to the bending beam.

7. A tension bar according to claim 1, wherein both the upper bar part and the lower bar part include projections which are arranged opposite the bending beam and are separated by the gap and which are provided with the measuring device for measuring the width of the gap.

8. A tension bar according to claim 1, wherein the connecting element is designed as a bolt threaded into a threaded bore in the upper bar part and extends through a bore in the lower bar part.

9. A tension bar according to claim 1, wherein the measuring device is designed as a proximity sensor or a similar sensor connected to an evaluating unit.

* * * * *